(12) United States Patent
Herffurth et al.

(10) Patent No.: US 6,318,535 B1
(45) Date of Patent: Nov. 20, 2001

(54) ARRANGEMENT FOR TRANSFERRING BRAKING TORQUES IN MOTOR VEHICLES

(75) Inventors: Rainer Herffurth, Fuldatal; Uwe Mierisch, Baunatal; Christian Mosler, Stuttgart; Werner Spielmann, Burgstetten, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/450,393

(22) Filed: Nov. 29, 1999

(30) Foreign Application Priority Data

Nov. 30, 1998 (DE) ............................. 198 55 235
Nov. 30, 1998 (DE) ............................. 198 55 239

(51) Int. Cl.$^7$ .................................................. B60K 41/26
(52) U.S. Cl. ........................... 192/218; 188/71.1; 74/607
(58) Field of Search ....................... 188/71.1; 74/607; 192/218

(56) References Cited

U.S. PATENT DOCUMENTS

| 1,567,699 | 12/1925 | Bendix . | |
|---|---|---|---|
| 3,955,650 | 5/1976 | Ellis . | |
| 4,391,351 | * 7/1983 | Jirousek et al. | 188/18 |
| 5,368,135 | 11/1994 | Sallee . | |
| 5,620,388 | * 4/1997 | Schlegelmann et al. | 475/230 |
| 5,673,776 | * 10/1997 | Fitch et al. | 192/4 A |
| 6,186,262 | * 2/2001 | Mann et al. | 180/308 |

FOREIGN PATENT DOCUMENTS

| 828 639 | 7/1949 | (DE) . |
| 1 430 534 | 9/1970 | (DE) . |
| 25 57 957 | 8/1976 | (DE) . |
| 0 794 096 | 9/1997 | (EP) . |
| 1 529 761 | 10/1978 | (GB) . |

\* cited by examiner

Primary Examiner—Robert J. Oberleitner
Assistant Examiner—Xuan Lan Nguyen
(74) Attorney, Agent, or Firm—Klaus J. Bach (57) ABSTRACT

In an arrangement for transferring brake torques of a vehicle drive line including a differential transmission having a housing, a driving pinion and two wheel shafts supported in the housing and a brake structure arranged adjacent the housing, a brake member is provided for rotation with the driving pinion and a braking member is supported by the housing of the differential transmission for engaging the brake member when the brake structure is actuated.

9 Claims, 8 Drawing Sheets

ARRANGEMENT FOR TRANSFERRING BRAKING TORQUES IN MOTOR VEHICLES

BACKGROUND OF THE INVENTION

The invention resides in an arrangement for transferring braking torques particularly in commercial vehicles with a drive axle including a differential transmission having a driving pinion and two drive shafts and a braking device associated with the differential transmission.

In an arrangement of this type known in the art, the brake torque is generated by a cone wheel mounted in the axle housing and driven by the differential transmission. The cone wheel is engaged by a brake drum, which is axially movably in the differential transmission housing into engagement with the cone wheel for frictional engagement therewith (DE 828 639). Such a supplemental brake arrangement requires a large installation space in axial direction of the cone wheel. Furthermore, because of the relatively small transmission ratio of the torque entering the cone wheel relative to the vehicle wheels, relatively large brake operating forces are required.

It is the object of the present invention to provide a simple braking arrangement of the above type, which provides large braking effects with small operating forces.

SUMMARY OF THE INVENTION

In an arrangement for transferring brake torques of a vehicle drive line including a differential transmission having a housing, a driving pinion and two wheel shafts supported in the housing and a brake structure arranged adjacent the housing, a brake member is provided for rotation with the driving pinion and a braking member is supported by the housing of the differential transmission for engaging the brake member when the brake structure is actuated.

In this arrangement, the brake torque is transferred to the driving pinion of the differential transmission so that the braking torque of the brake member associated with the pinion is transmitted at the transmission ratio of the differential transmission. As a result, high braking effects can be achieved with relatively low brake operating forces. The brake member, that is a brake drum or a brake disc, is for example, mounted on the pinion in form-locking or frictional engagement therewith, whereby a compact rigid and simple brake device is formed.

The driving pinion in this case is mounted on a shaft so as to be rotatable therewith, for example, by an elastic or rigid coupling or by way of a flange. The brake member is rotatable with the shaft, particularly in a friction- or form-locking manner. The brake member is supported by the axle housing propped up by a structure outside, for example, at a distance from, the differential transmission. The support arrangement outside the differential transmission by a support structure provides for a particularly effective embodiment, which is rigidly supported but can be easily installed and removed. With the large leverage obtained by such a prop-up arrangement, large torques can be generated and transferred without affecting the mounting structure for the differential transmission or the axle.

In a particular embodiment of the invention, the brake arrangement is in the form of a drum brake, particularly a dual power drum brake. In this way, conventional brake structures which are manufactured in large numbers can be utilized. They have also all the well-known advantages of dual power drum brakes such as low operating forces.

In another embodiment of the invention, the braking arrangement includes an axially movable operating mechanism.

This provides for a simple arrangement for an operating cable and the guide structure therefore. Also, the cable is relatively short and can be supported and guided with low friction. With an axial operating mechanism, it is further possible to use known brake arrangements, which have a symmetrical braking effect that is they generate the same braking force in either direction of rotation of the drive pinion.

Preferably, the brake arrangement is provided in addition to the wheel brakes of a vehicle to be used as a parking brake. In this way, redundancy is provided whereby the safety is increased. Also, the arrangement, acting in cooperation with the wheel brakes, can increase the brake holding torque.

The prop-up arrangement preferably includes an arm, which extends from the brake body and is connected to a strut mounted, for example, to the differential transmission housing or the axle by way of a pivot connection. In this way, the arm and the strut can be arranged in different planes. Relative movements between the components involved can be accommodated so that movements of the brake arrangement relative to the housing or the axle are possible. The arrangement also permits a selection of the installation spaces for additional components such as the location of the brake cable.

Advantageous embodiments of the invention will be described below on the basis of the accompanying drawings.

DESCRIPTION OF PREFERRED EMBODIMENTS

Figure 1:
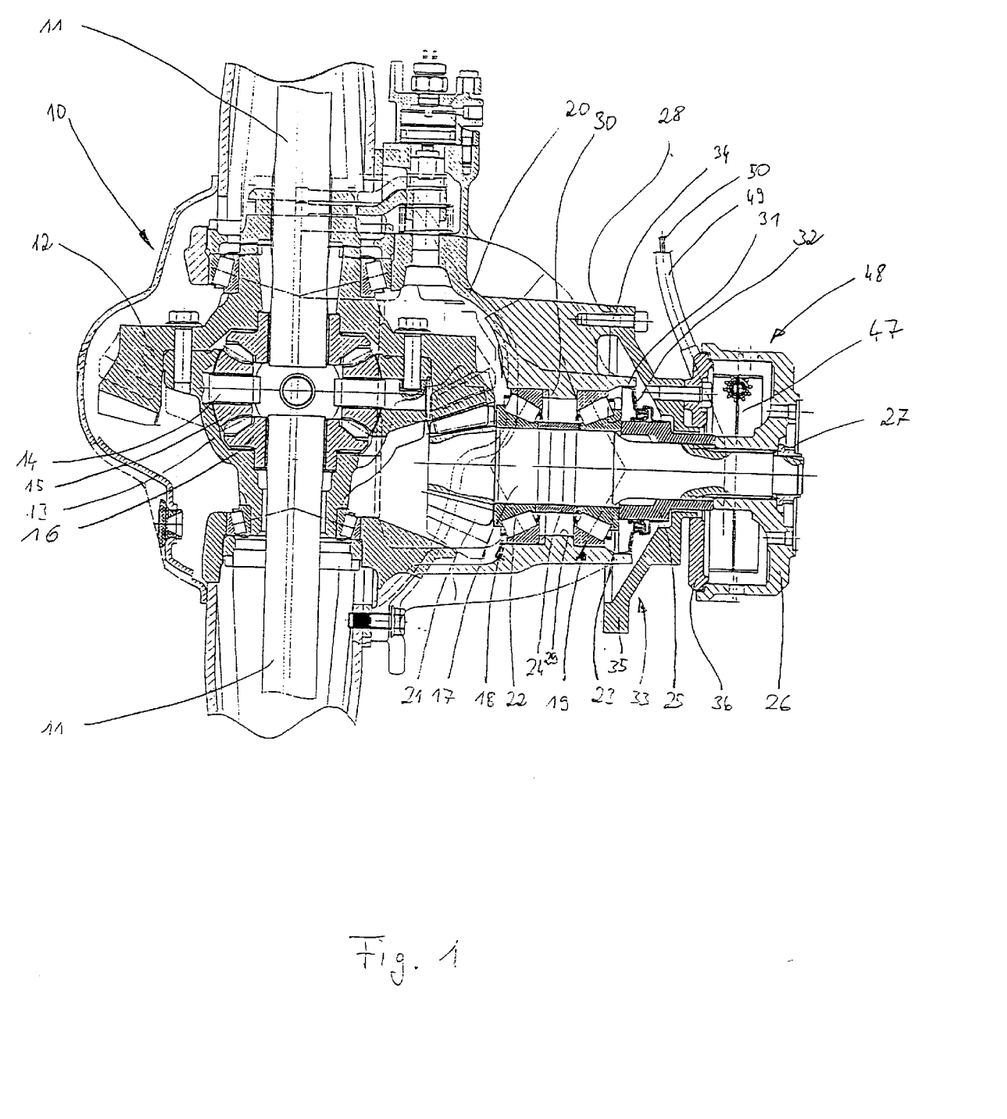
FIG. 1 is a cross-sectional view of a differential transmission with a supplemental brake arrangement according to the invention.

The drive line of a motor vehicle includes an engine with a transmission, a drive shaft, a differential transmission 10 and the two drive half shafts 11 extending from the differential to the drive wheels of the vehicles for transmitting the drive torque to the drive wheels. The arrangement according to the invention can be used selectively in connection with the drive for the front axle and/or the drive for the rear axle. By way of the drive-line a drive torque for the movement of a vehicle can be transmitted to the drive wheels, but also a movement inhibiting torque can be transmitted. Additional braking torques can be generated by the wheel brakes of the vehicle.

The drive torque is transmitted from the drive shaft to the driving pinion 17, which engages a spur bevel gear 12 mounted to a differential gear cage 13 with a differential gear shaft 14. The differential gear shaft 14 carries differential bevel gears 15, which are in engagement with drive shaft bevel gears 16 so as to rotate the opposite drive shafts 11 with the same or different drive torques.

The driving pinion 17 is rotatably supported in the housing 20 of the differential transmission 10 by tapered roller bearings 18, 19. At its end opposite the drive shaft, the driving pinion 17 includes a tapered spur gear 21, which is in engagement with the spur bevel gear 12. The inner rings 22, 23 of the tapered roller bearings 18, 19 are positioned on the driving pinion 17 at a predetermined distance from each other by a spacer sleeve 24. The inner rings 22, 23 are disposed in front of the tapered spur gear 21 toward the drive shaft end of the driving pinion 17. A seal sleeve 25 is disposed on the driving pinion 17 adjacent the tapered roller bearing 19 and a brake drum 26 is mounted on the driving pinion in form-locking relationship adjacent the seal sleeve 25, for example, by a splined shaft bush. The inner rings 22, 23, the spacer sleeve 24, the seal sleeve 25 and the brake drum 26 are axially movably disposed on the driving pinion and are pressed against a shaft shoulder, in particular the tapered spur gear 21, by a shaft nut 27 arranged at the end of the driving pinion 17 so that they are firmly fixed in position.

The housing 20 includes, at its end position adjacent the drive shaft, a flange area 28 which is oriented transverse to the driving pinion 17 and from which a bore 29 including shoulders 30 extends into the housing 20, which bore 29 receives the tapered roller bearings 18, 19. The front end of the bore 29 is provided with a recess 31, in which a seal 32 is disposed. The seal 32 has seal surfaces or seal lips, which cooperate with the seal sleeve 25 (rotating with the driving pinion 17) so that a seal is formed between the interior of the housing 20 of the differential transmission 10 and the ambient.

A brake shield 33 is connected to the housing 20 at the flange area 28 by means of flange bolts 34, which are distributed circumferentially about the longitudinal axis of the driving pinion 17. The brake shield 33 includes a brake shield bell 35 and a brake shoe carrier 36.

The brake shield bell 35 is connected to the housing 20 by the flange bolts 34 and is pressed against the flange area 28. From the flange area 28, the brake shield bell 35 extends toward the brake drum 26 in a hollow conical—that is, funnel-like form. In the end area adjacent the brake drum 26 the brake shield bell 35 includes another flange area 38 which extends transverse to the driving pinion 17 and parallel to the flange area 37 and which has threaded bores 39 distributed circumferentially with respect to the flange area 38 and extending parallel to the axis of the driving pinion 17. The brake shield bell 35 is essentially rotationally symmetrical with respect to the driving pinion 17. The driving pinion 17 extends through a bore 30 in the brake shield bell 35 together with the seal sleeve 25 without contacting the brake shield bell 35. Parts of the housing 20, the recess 31 and/or the seal 32 may be arranged within the brake shield bell 35 or may extend into it.

The brake shoe carrier 36 is essentially disc-shaped and includes circumferentially spaced bores 41, which are in axial alignment with the threaded bores 39, when the brake shoe carrier 36 is in its proper position coaxially with the driving pinion 17. The brake shoe carrier 36 is mounted to the brake shield bell 35 and, consequently, to the housing 20 by bolts 78. The driving pinion 17 extends through the brake shoe carrier 36 and the brake shield bell 35 without contacting them.

The brake drum 26 includes two concentric hollow cylinder portions 42, 43, which are joined at their ends adjacent the drive shaft by a disc structure 44 extending transverse to the axis of the driving pinion 17. The inner surface of the hollow cylindrical portion 43 is provided with axial grooves corresponding to axial grooves on the driving pinion 17 for firm rotational engagement therewith. The disc structure 44 extends flange-like from the hollow cylindrical hub portion 43 and includes annularly spaced bores 45. The drive shaft can be mounted to the brake drum 26 by bolts extending into the bore 45 (not shown).

The hollow cylinder portions 42, 43 and the disc structure 44 form an annular cavity 46, which is open toward the brake shield 33 and in which the brake shoes 47 are received, the brake shoes 47 being supported by the brake shoe carrier 36. If not actuated, the brake shoes 47 are not in contact with the brake drum 26.

Figure 2:
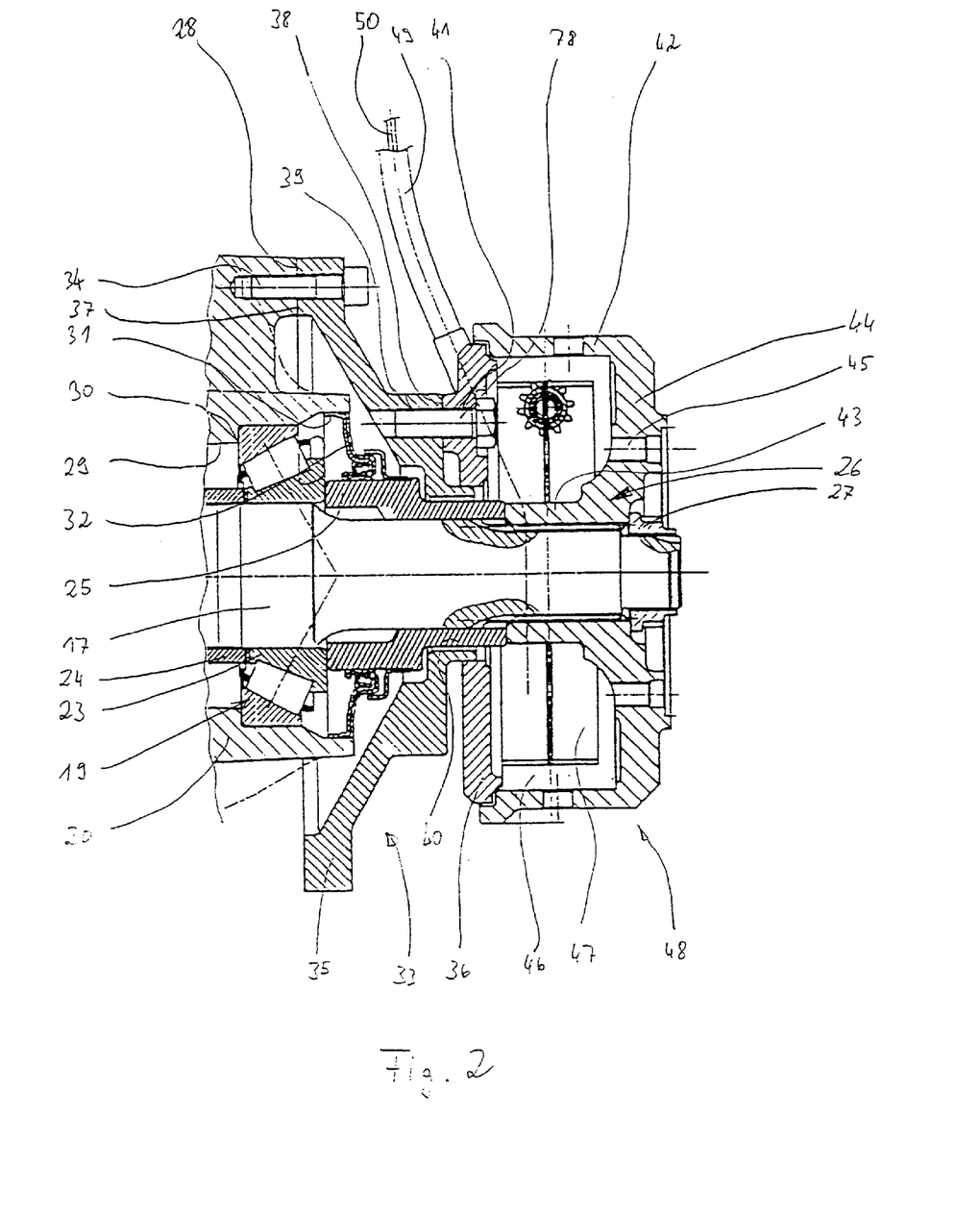
FIG. 2 is an enlarged view of a portion of FIG. 1 showing the brake arrangement.

As commonly known, the brake apparatus 48 formed by the brake shoe carrier 36, the brake shoes 47 and the brake drum 26 is operable by a brake cable 50 disposed in a cable guide 49. The brake shoes 47 are radially forced apart and at least portions of the brake shoes 47 are pressed against the inner cylindrical surface 51 of the brake drum 26. In this way, the differential transmission 10 can be locked for example manually, whereby also the vehicle wheels are locked. The brake cable 50 for actuating the brake apparatus 48 extends through an opening in the brake shoe carrier 36 as indicated in FIG. 2.

Figure 3:
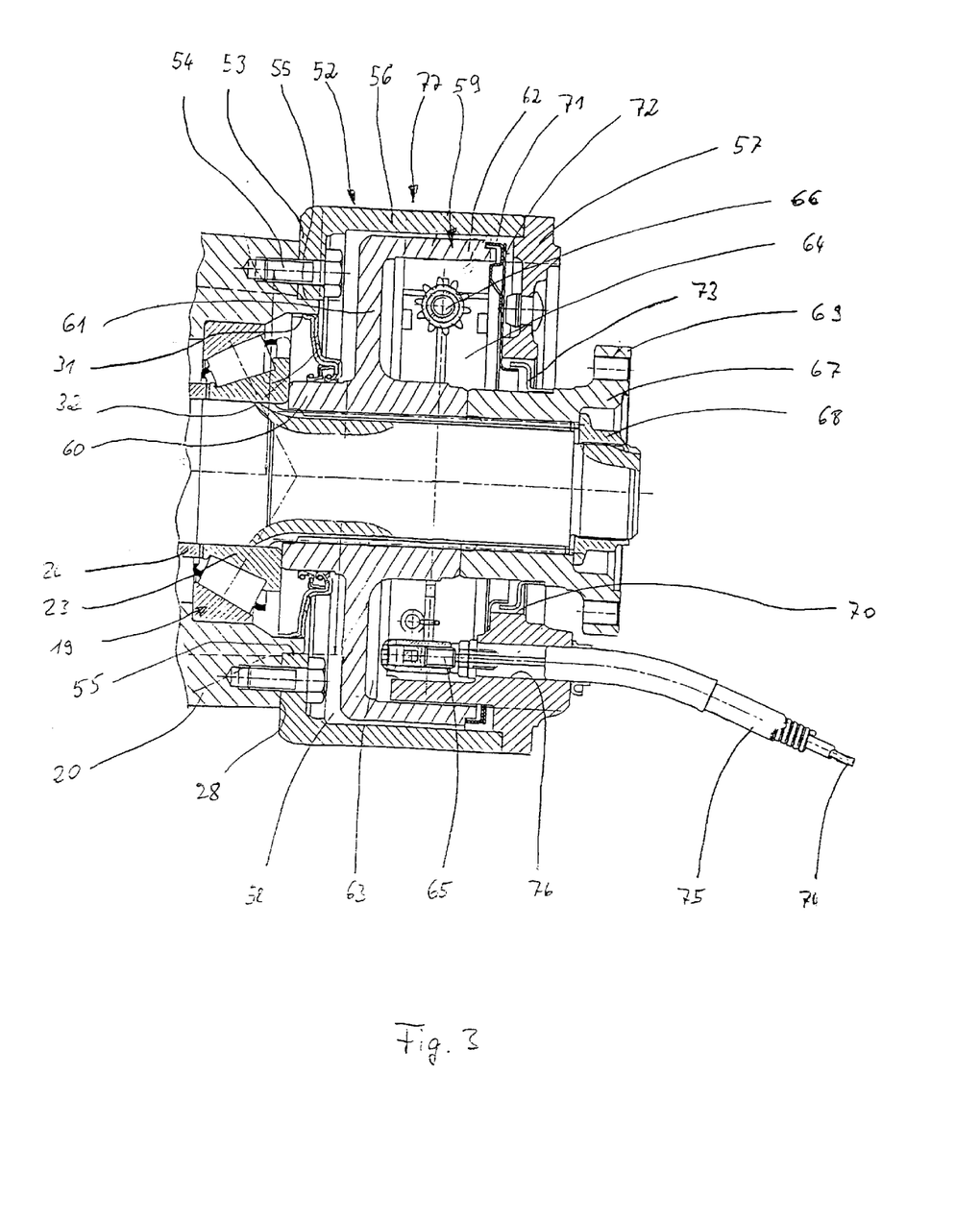
FIG. 3 shows another embodiment of the brake arrangement according to the invention.

FIG. 3 shows an alternative embodiment of the brake apparatus 48 and the adjacent components. A brake shield bell 52 is mounted to the housing 20 and includes an annular inwardly extending flange portion 53, which is connected to the flange area 28 of the housing 20 by bolts 54. The flange portion 53 defines an inner opening 55, in which the seal structure 32 and the hub 60 are disposed. At its side remote from the housing 20, a hollow cylindrical wall section 56 extends from the radially outer end of the flange portion 53 in axial direction of the drive pinion 17. A brake plate 57 is mounted to the outer end of the cylindrical wall section 56, for example by bolts, which are not shown in the drawings, and extends transverse to the driving pinion 17. The flange portion 53, the cylindrical wall section 56 and the brake plate 57 define a cavity 58 in which a brake drum 59 is disposed which is open toward the drive shaft.

The brake drum 59 includes a tubular hub 60 with an internal structure for a form-locking connection with the driving pinion 17. At the end adjacent the housing 20, the outer surface of the hub 60 forms a seal surface for the seal 32. A disc portion 61 extends transverse to the hub 60 and, at its radially outer end, joins at its side remote from the housing 20 a cylindrical section 62. The air gap is formed between the cylindrical drum section 62 and the brake shield bell 52. The outer and inner surfaces of the cylindrical drum section 62 extend essentially parallel to the inner surface of the hollow cylindrical wall portion 56 and to the longitudinal axis of the driving pinion 17. The brake shoes 64 with accessory equipment such as operating components 65 and adjustment structures 66 are arranged in the usual manner in the drum space 63 formed by the drum section 62 and the disc portion 61. The brake shoes 64 are supported on the brake plate 57 in the normal way.

The inner ring 22, the spacer sleeve 24, the inner ring 23, the hub 60 and a flange member 67 are all arranged adjacent one another on the driving pinion 17. They are clamped against a shaft shoulder by a shaft nut 68 screwed onto the end portion of the driving pinion 17. The hub 60 and the flange member 67 are disposed on the driving pinion in form-locking relationship therewith preferably by way of a splined shaft structure.

The flange member 67 is provided, at its end adjacent the drive shaft, with flange 69 which extends over the shaft nut 68 and by way of which drive or engine brake torque can be transmitted from the drive shaft to the driving pinion 17. The flange member 67 extends into a central opening 70 of the brake plate 57.

The differential transmission housing 10 is sealed by the seal 32 disposed between the housing 20 and the hub 60 which rotates together with the driving pinion 17. The brake structure 77 is sealed off by seal elements 71, 72 arranged between the brake drum 59 and the brake shield 57 and the seal elements 72, 73 arranged between the brake plate 57 and the flange member 67.

The brake cable 74 and the cable guide 75 enter the brake drum 59 in the embodiment of FIG. 3 in the axial direction of the driving pinion 17 through a bore 76 in the brake plate 57.

In the arrangements described so far, the brake is mounted onto the differential transmission housing.

Figure 4:
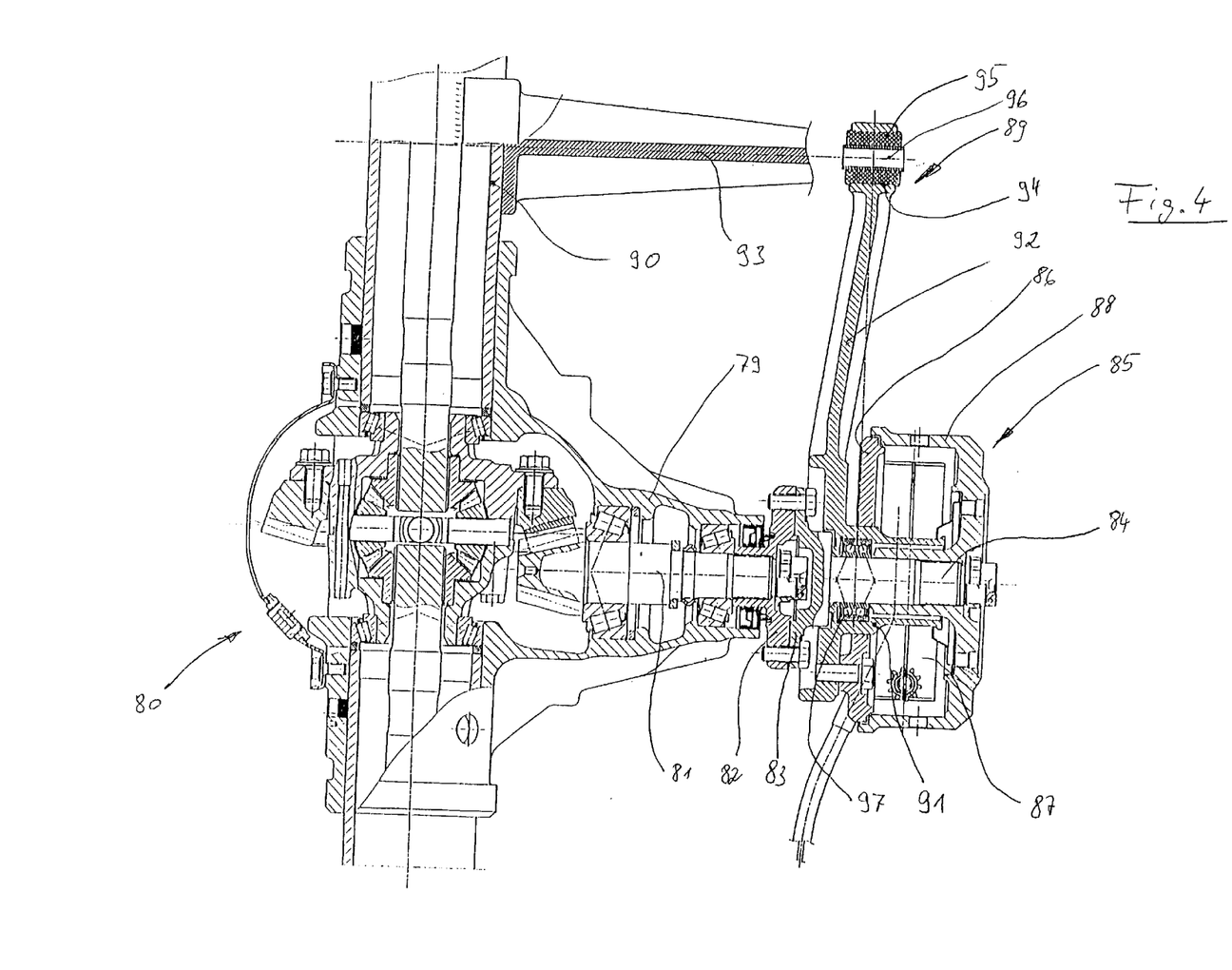
FIG. 4 is a cross-sectional view of a differential transmission showing a brake body with a torque-accommodating support arm.

In the embodiment as shown in FIG. 4, a driving pinion 81 extending from a housing 79 of a differential transmission 80 is connected, by way of a flange 82 and a counter flange 83 mounted thereto, to a shaft 84 which is disposed in axial alignment with the driving pinion 81.

A brake structure 85 essentially corresponding to that described above is disposed on the shaft 84. It includes for example a brake plate 86 on which brake shoes 87 are supported within a brake drum 88. Unlike in the embodiment according to FIG. 1, the brake plate 86 is supported by way of a support structure 89 on the axle of the differential gear transmission 80 for example on the axle housing 90.

The support structure 89 includes an essentially hollow cylindrical support body 91, which is disposed partially within the brake shoes 87. The brake plate 86 is supported on the support body 91. The support body 91 includes at least one bearing structure 97, for example two ball bearings by which the support body 91 is supported on the shaft 84. The support body 91 and the shaft 84 are arranged concentrically.

The support structure 89 includes an arm 92, which extends radially therefrom. In the embodiment shown in FIG. 4, the arm 92 is an integral part of the support body 91 and the brake plate 86 is bolted to the support body 91. The free end of the arm 92 is connected to a holder 93 extending from the axle housing 90 in the longitudinal direction of the vehicle that is about parallel to the axis of the driving pinion 17. The holder is firmly mounted to the axle housing 90 for example, by bolting or welding.

The arm 92 and the holder 93 are joined by a bearing element 95, which is disposed in a bearing eye 94 of the arm 92 and which receives a pin 96 projecting from the free end of the holder 93. The bearing element 95 consists preferably of a resilient and/or dampening material.

The arm 92 and the holder 93 are formed so as to withstand the bending forces, that is, they are formed so as to have a relatively large polar moment of inertia.

A drive shaft is connected to the shaft 84 or the brake drum 88 for the transmission of the drive torque between the engine and the vehicle wheels.

In an alternative embodiment the driving pinion 81 and the shaft 84 are an integral structure. In this way, the jointure of the two by way of the flanges can be saved, whereby the arrangement is also more compact. In addition, the bearing structure 97 may be omitted if the pinion shaft 81 would extend only slightly from the housing 79 of the differential transmission 80.

The brake structure 85 is only slightly spaced from the differential transmission in an axial direction. Preferably, the shaft 84 is very short.

Figure 5:
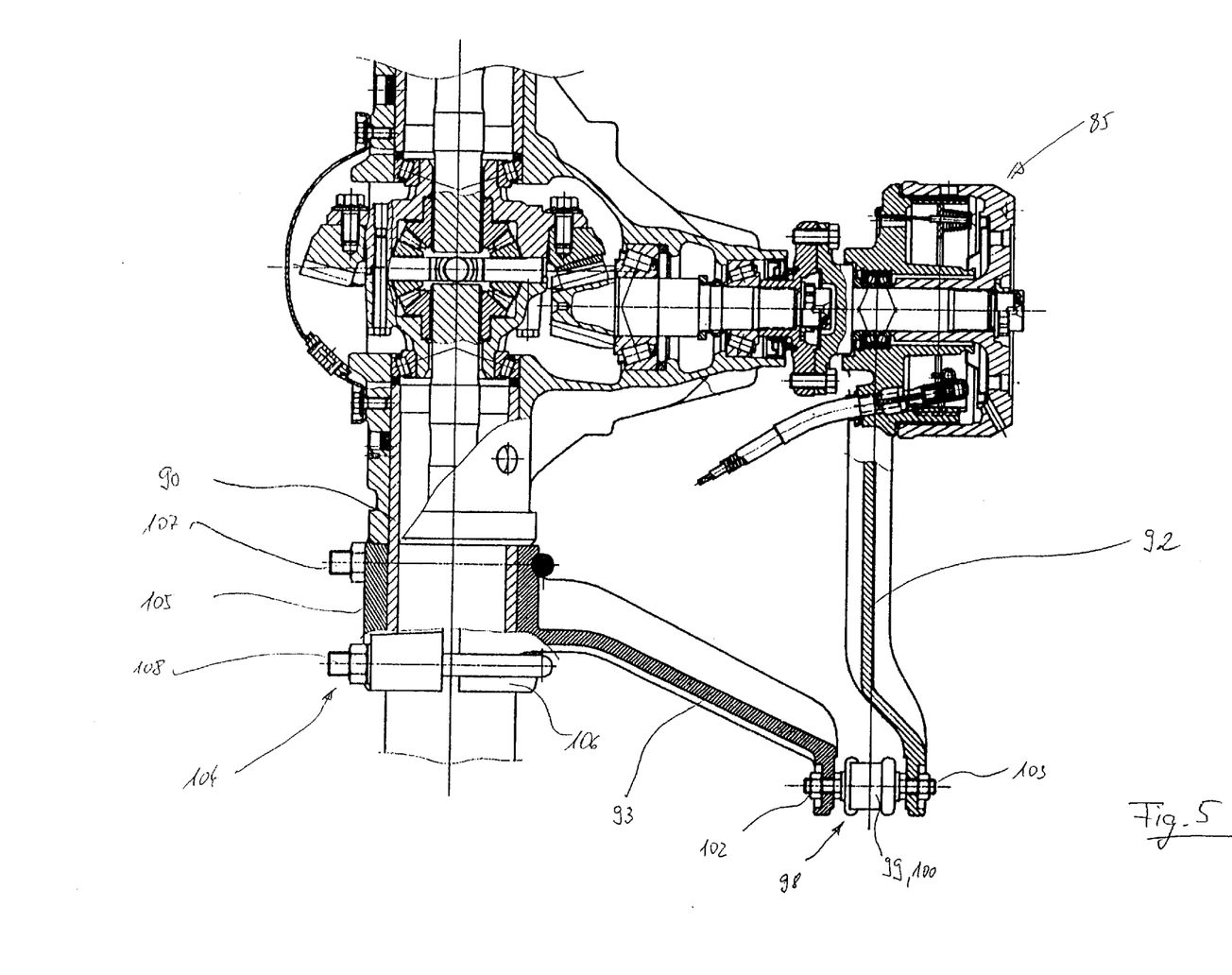
FIG. 5 shows another embodiment similar to that of FIG. 4.

In the arrangement as shown in FIG. 5, the arm 92 and the holder 93 are interconnected by way of a connecting element 98. The connecting element 98 includes for example a pivot link 99 having opposite ends, one connected to the arm 92 and the other to the holder 93. The joint permits pivot movement around at least one axis. Preferably the joint includes a ball joint 100, 101 (FIG. 7), which permits relative pivoting between the pivot link 99 and the arm 92 and the holder 93, respectively. Furthermore, the joint, particularly a ball joint, may be resilient to permit elastic displacements and/or pivot movements. The connection between the ball joints 100, 101 of the pivot link 99 and the arm 92 or the holder 93 is achieved by way of bolts 102, 103. The pivot link 99 extends about vertically. The longitudinal axes of the holder 93, the pivot link 99 and the arm 92 are arranged in the form of a Cartesian coordinate system or they are inclined relative thereto by not more than 10 degrees, 20 degrees or 30 degrees. The components 92, 93 and 99 may be straight line or curved structures.

As shown in FIG. 5, the holder 99 is mounted to the housing 90 by way of a clamping device 104, which includes two half shells 105, 106 whose internal shape corresponds to the outer shape of the housing 90. The half shells 105, 106 partially surround the housing 90 at opposite sides with gaps remaining between the adjacent face areas. The half shells 105, 106 can be clamped together by U-bolts 107, 108 for firm engagement with the housing 90.

Figure 6:
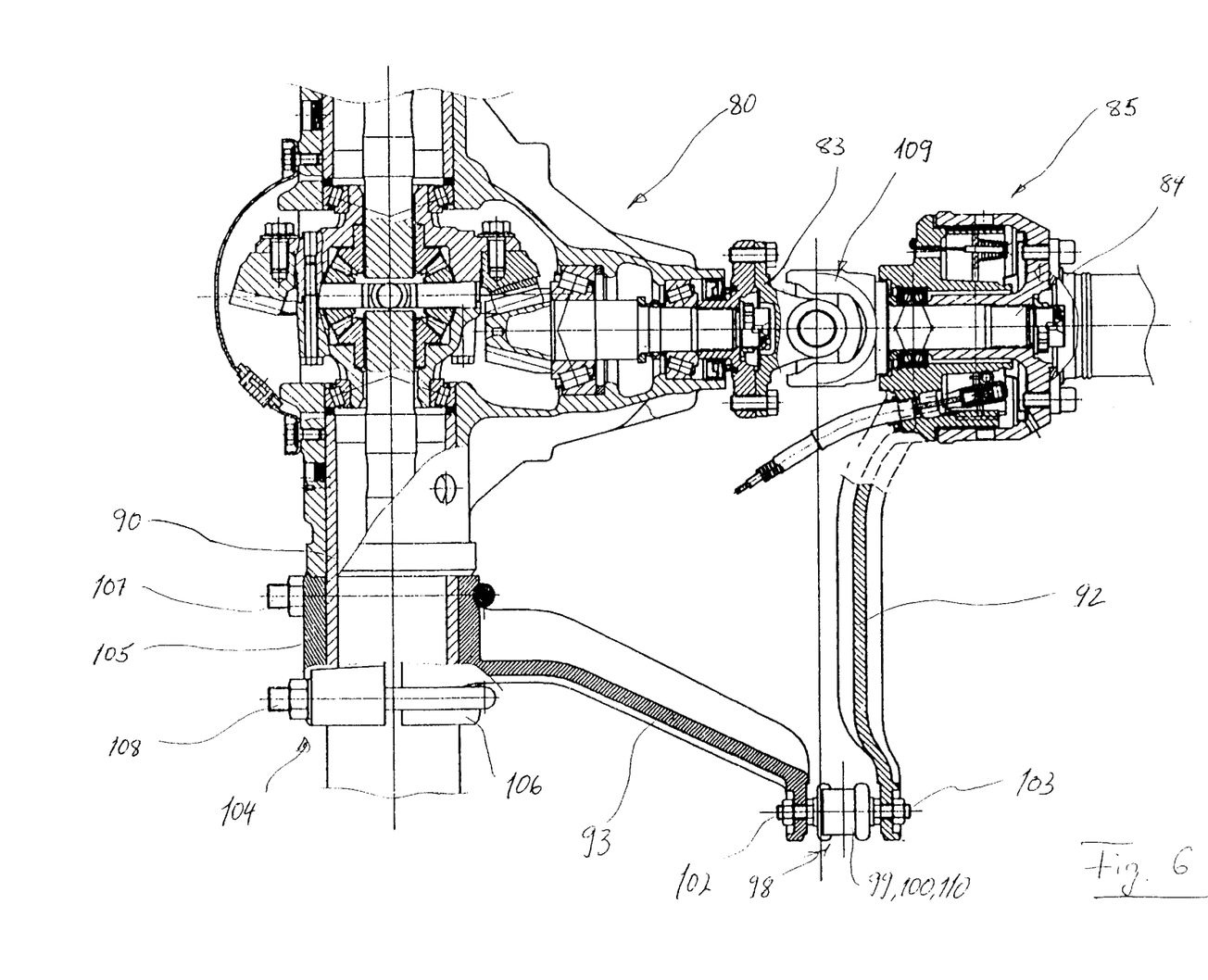
FIG. 6 shows an arrangement where the brake is mounted on the drive shaft.

In the embodiment as shown in FIG. 6, a joint, particularly a universal joint 109 is disposed between the shaft 84 and the counter flange 83 to permit an angular displacement of the longitudinal axis of the driving pinion 81 relative to the longitudinal axis of the shaft 84. The universal joint 109 is arranged between the differential transmission 80 and the brake structure 85 preferably with little space therebetween.

The brake cable can be arranged in various ways, but generally in the longitudinal direction of the vehicle as shown in FIGS. 5 and 6.

Figure 7:
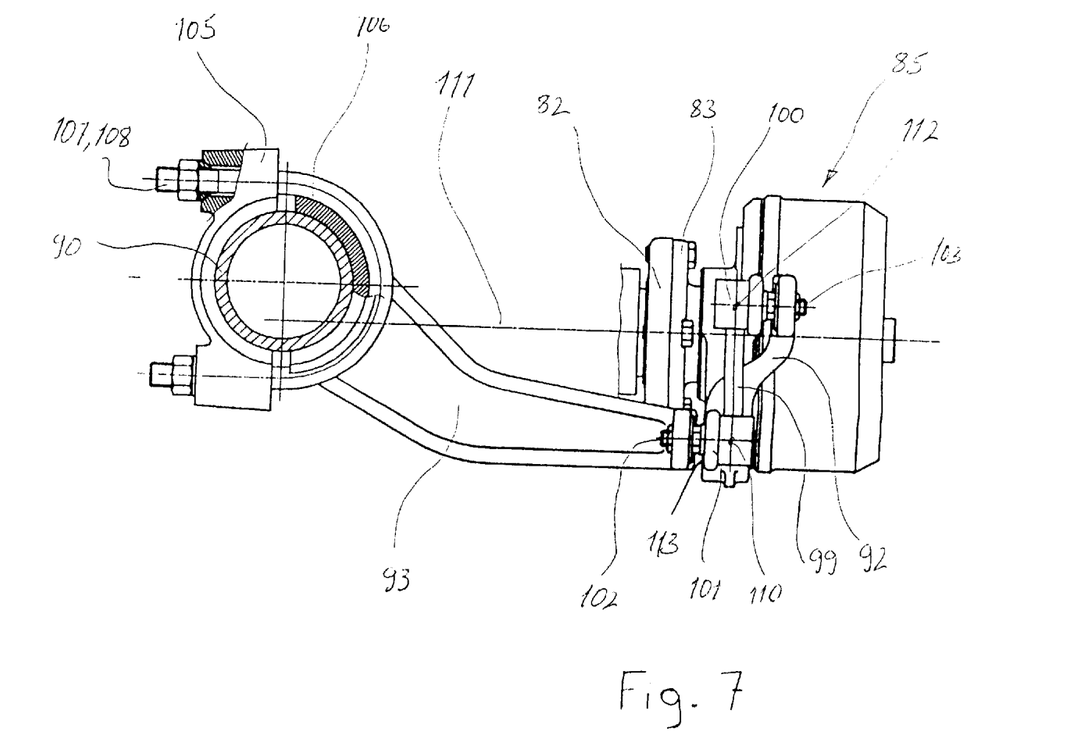
FIG. 7 is a side view of the arrangement as shown in FIG. 5 and, FIG. 8 shows an alternative brake arrangement employing a disc brake.

As shown in FIG. 7, the joint 110 between the pivot link 99 and the holder 93 is disposed below a horizontal plane 111 extending through the longitudinal axis of the shaft 84 and below the longitudinal axis of the housing 90. The joint 112 of the pivot link 99 with the arm 92 is (slightly) above the plane 111. The distances of the joint 113 between the arm 92 and the brake structure 85 and of the joint 110 from the plane 111 are about the same. The pivot link 99 extends vertically in an about straight line, whereas the arm 92 is curved. The components 92, 93 and 99 are so arranged and/or the arm 92 is so curved that the joint 103 and the pivot link 99 with the joints 110, 112 are all disposed in a plane which extends transverse to the longitudinal vehicle axis.

As shown in FIG. 7, the joints 110, 112, that is, their center pivot points are arranged in a vertical plane extending in a direction transverse to the longitudinal vehicle axis and through the center point of the universal joint 109. In this way, the support torque effective during braking is as small as possible and a lift movement of the drive shaft is limited.

Figure 8:
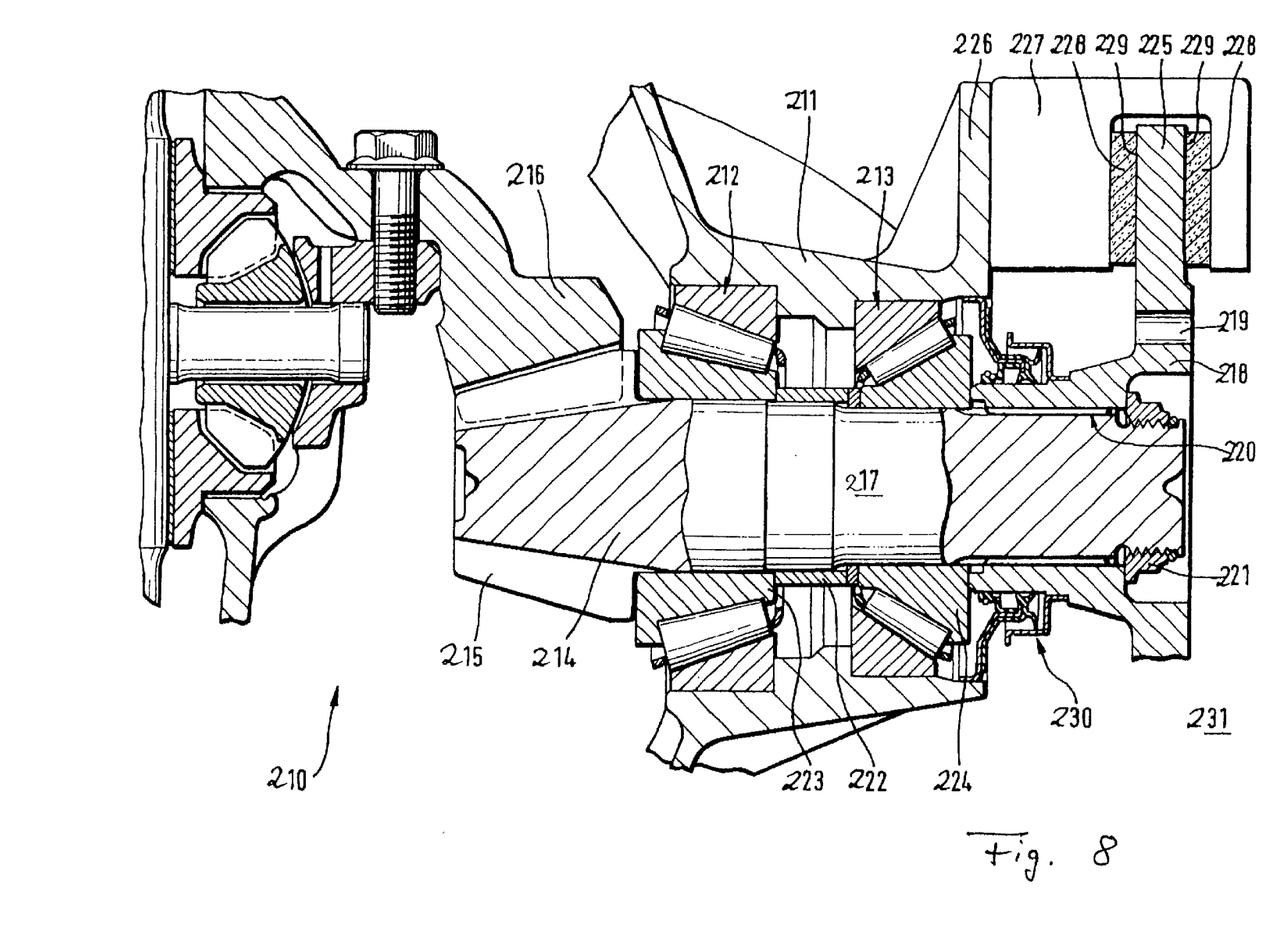

As shown in FIG. 8, in one embodiment, a differential transmission 210 includes a driving pinion 214, which is supported in a housing 211 by two tapered roller bearings 212, 213. The driving pinion 214 includes a bevel gear 215, which is in engagement with a spur bevel gear 216 of the differential transmission 210 and also a shaft portion 217. The shaft portion 217 extends from the housing 211 and is connected to a drive shaft by way of a connecting flange 218. For this purpose, the connecting flange 218 has circumferentially spaced axial bores 219 for mounting thereto a corresponding flange of the drive shaft.

The connecting flange 218 is connected to the shaft portion 217 in a form-locking manner by well-known mounting means such as an interlocking axial groove and tooth arrangement 220. The connecting flange 218 is forced by a shaft unit 221 disposed at the free end of the driving pinion axially into engagement with an inner race ring 224 of the tapered roller bearing 212 and by way of a sleeve 222 and the inner race ring 223 of the bearing 212 with the shoulder of the driving pinion 214.

The connecting flange 218 carries an annular brake disc 225, which extends in a plane normal to the longitudinal axis of the driving pinion 214. In the embodiment shown in FIG. 8, the connecting flange 218 and the brake disc 225 are integral. However, alternative arrangements are possible, wherein the brake disc 225 and the connecting flange 218 are separate component and removably connected to each other.

The brake disc 225 extends partially into a brake caliber 227 and between brake pads 228. The caliper 227 is supported by a console 226 of the housing 211. The brake pads 228 can be pressed against the brake surfaces 229 of the brake disc 225. Between the (stationary) housing 211 and the driving pinions 214 or components rotating therewith such as the connecting flange 218, a seal 230 is provided in a well-known manner for sealing the interior of the differential transmission 210 with respect to the ambient 231.

All the embodiments described and shown in the drawings can be provided with any known braking structures such as an electro-dynamic brake or an eddy current brake. However, disc brakes or drum brakes are preferred.

What is claimed is:

1. An arrangement for transferring brake torques in motor vehicles including a differential transmission having a housing, a driving pinion and two wheel shafts rotatably supported in said housing, a drive shaft operatively connected to said driving pinion for rotation therewith, a brake structure arranged adjacent said differential transmission and comprising a brake member arranged adjacent said drive shaft for rotation therewith, a braking member supported adjacent said brake member for engagement with said brake member and an operating mechanism for actuating said braking member in order to generate a braking torque for braking said brake member and said driving pinion, a holder extending front said transmission housing adjacent said wheel shaft and an arm extending from said braking member, said holder and said arm being joined by way of a pivot link including joints disposed between said pivot link and said holder and said arm respectively for transferring said braking torque from said braking member to said holder so as to by-pass said differential transmission housing.

2. An arrangement according to claim 1, wherein said brake member is connect to said drive shaft for rotation therewith.

3. An arrangement according to claim 2, wherein said drive shaft is disposed in axial alignment with said driving pinion.

4. An arrangement according to claim 2, wherein a universal joint is disposed between said driving pinion and said drive shaft.

5. An arrangement according to claim 1, wherein said brake structure includes a drum brake in which said brake member is a brake drum and said braking member comprises at least one brake shoe for engagement with said brake drum.

6. An arrangement according to claim 1, wherein said brake structure includes an axially extending operating mechanism.

7. An arrangement according to claim 1, wherein said brake structure is provided in addition to wheel brakes as normally provided for motor vehicles, said brake structure and said wheel brakes co-operating for generating a high braking torque.

8. An arrangement according to claim 4, wherein a plurality of pivot joints is provided between said pivot link and said holder and also said arm are arranged in a vertical plane extending also through said universal joint disposed between said driving pinion and said brake structure.

9. An arrangement according to claim 1, wherein said holder, said pivot link and said arm are joined at right angles with respect to one another.

* * * * *